United States Patent Office 3,252,645
Patented May 24, 1966

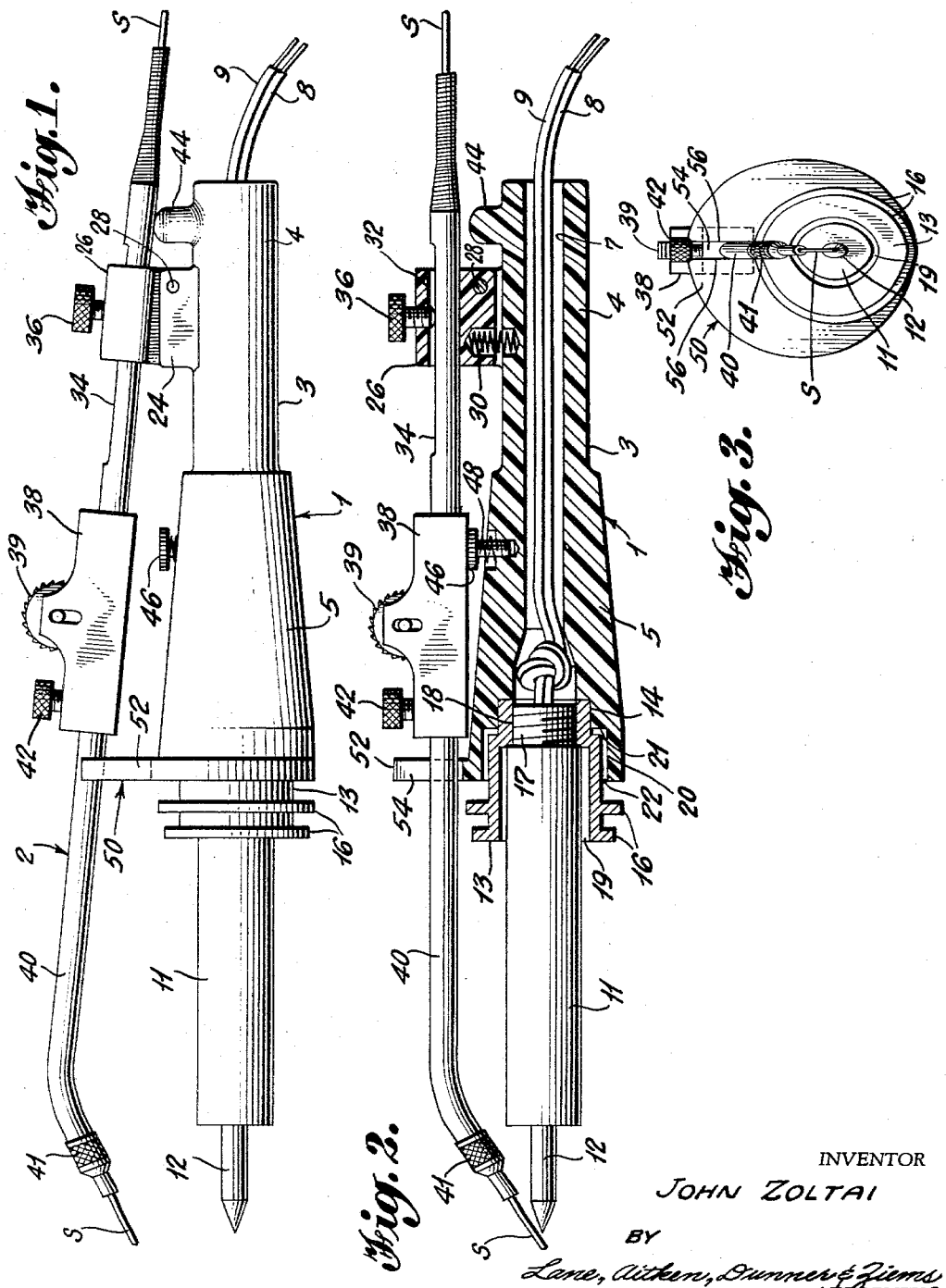

3,252,645
SOLDERING TOOL
John Zoltai, 100 Artist Road, Santa Fe, N. Mex.
Filed Feb. 20, 1964, Ser. No. 346,591
12 Claims. (Cl. 228—52)

This invention relates to soldering tools, and more particularly, to soldering irons having solder feeder attachments which are adjustable to allow the solder to be fed to the soldering iron tip is precisely the same predetermined position each time the solder is brought toward the heated tip of the soldering iron.

In the production of complex electronic equipment, such as, television sets, radios, computers, and other electronic devices, manufacturing and repair problems often arise in the soldering of components for continuous, fault-free operation. The complexity of such electronic equipment requires many more components than were previously employed to perform with the high degree of efficiency required. All these components must be connected in the various electronic circuits in the shortest possible time and in such a manner that they will meet rigid specifications. Furthermore, the introduction of semiconductor components such as transistors, tunnel diodes, and the like, has led to emphasis on miniaturization in the electronics industry. Again, the requirement of exacting an intricate production technique is felt.

In many instances the great advances of the electronics industry were not followed by similar advances in the tools used in the manufacture and repair of the new equipment. Where it was once sufficient to hold a soldering iron in one hand, a piece of solder in the other hand and merely place both in operative engagement to the piece being soldered, with the development of the complex equipment of the type referred to, it soon became apparent that better methods and tools were required to keep pace with the devices being made. Solder feeding devices attached to solder irons were provided to facilitate manipulation with one hand, allowing a person's other hand freedom to hold the work and make adjustments as necessary. However, such prior art feeding devices were usually more concerned with merely providing some solder to the tip of the soldering iron rather than providing a precision tool that could be used in the production of the complex electronic equipment mentioned above, and their repair. In other words, the emphasis was on freeing an operator's second hand rather than providing a precision tool.

To accurately deposit an exact amount of solder at a location not easily reached and to insure that the heat of the soldering iron will not cause damage to any components or loosen any other solder joints has become a very important requirement of present-day soldering irons. Close tolerances must be met and in many instances specifications require very small distances between the components to be soldered, and even between the soldering joints themselves. Further, when an electronic device has to be repaired it is often the case that only one or several components have to be removed and replaced while the other components in close proximity to the one replaced should not be dislodged.

In accordance with the present invention, therefore, a precision soldering tool is afforded by which a soldering iron and solder dispenser are intimately combined to assure substantially complete and accurate cooperation of the feeder and iron. To provide substantially universal and positive guiding of the solder feeder with respect to the soldering iron, the two components are pivotally interconnected and guided in such a manner that the feeder is constrained to movement in a precisely defined path fixedly referenced to the soldering iron tip. In addition, stop means are provided to restrict both outward movement and inward movement of the feeder toward the iron to provide accurate control of the distance between the feeder and the iron particularly when the two are positioned in an operative or working position. To enable an extremely compact arrangement for ease of manipulation, a heat shield may be provided between the heating element of the soldering iron and the handle thereof and arranged so that the heat of soldering is dissipated to the atmosphere at a point spaced from the soldering or working tip of the iron.

Accordingly, it is one object of the present invention to provide a soldering tool capable of exacting precision in soldering operations.

It is another object of the invention to provide a soldering iron and feeder device of the type referred to in which the feeder is pivoted about a point within the soldering iron handle.

It is a further object of the invention to limit the movement of the solder feeder in its pivotal plane away from the heated soldering tip of a tool of the type referred to.

It is still another object of this invention to provide a device as aforementioned with guide means on the handle of the soldering iron to keep the movement of the solder feeder in its pivotal plane when used.

It is still a further object of this invention to provide a device as referred to with means to adjust the distance between the feeding end of the solder feeding device and the heated tip of the soldering iron.

It is still another object of the aforementioned invention to dissipate the major portion of the heat generated by the heating element of the soldering iron at a point removed from the working end of the soldering iron.

It is still a further object of this invention to provide a device of the type referred to with a heat shield and sink between the heat source and handle of the soldering iron.

It is still a further object of this invention to provide a device of the type mentioned above with means for adjusting the longitudinal position of the solder feeding device with the heated tip of the soldering iron.

Other objects and features of the present invention as well as a more complete understanding thereof will become apparent from the following description taken in conjunction with the accompanying drawings, wherein:

FIG. 1 is a side view of the soldering iron and feeder device embodying features of the present invention with the solder feeder in its normal position wherein the dispensing end thereof is pivoted away from the heated tip of the soldering iron.

FIG. 2 is a side view of the soldering iron and feeding device with the handle portion of the soldering iron shown in cross-section and illustrating further the position assumed by the solder feeder when it is pivoted to its operating position for dispensing solder to the heated tip of the solder iron; and FIG. 3 is a front view of the soldering iron and feeder device in its operating position.

Referring now to the drawings, there is shown a soldering tool embodying features of the invention which is comprised of a soldering iron indicated generally by the reference numeral 1 and a solder feeder indicated generally by the reference numeral 2. Soldering iron 1 includes a handle 3 made of a plastic or other insulating, low heat transfer material and having a generally cylindrical back portion 4 and a rearwardly tapering front portion 5, which allows the soldering iron to be firmly grasped by the operator. A passageway 7 is provided in handle 3 through which conductors 8 and 9 pass to provide energization to the heating portion of soldering iron 1. A gasket or plug (not shown) is inserted in the rear portion of passageway 7 which firmly grasps conductors 8 and 9 and forms a suitable seal in this part of handle 3. The remainder of the soldering iron comprises conventional heating element 11 which supplies the heat necessary for soldering to a heating tip 12 projecting forwardly of handle 3.

In order to provide a relatively cool handle and to dissipate ambient heat generated by heating element 11 to the atmosphere, a heat shield and sink 13 is provided at the front part of rearwardly tapered portion 5 of handle 3. Heat shield 13 is of cylindrical, cup-shaped configuration with its open end forward of handle 3 and its rear end press-fitted into or otherwise secured in a counterbore 14 in the rearwardly tapered portion 5. Fins 16 are provided on heat shield 13 to permit maximum heat dissipation into the air. Heat shield 13 is further provided with an internally threaded portion 17 which threadably engages an externally threaded portion 18 of heating element 11. An annular air gap 19 is provided between the forward portion of heat shield 13 and the rearward portion of heating element 11 to provide space for heat dissipation. A second counterbore 20 is provided in the forward end of handle 3 and having a larger diameter opening than counterbore 14. Counterbore 20 contains the central portion of heat shield 13 and terminates at an annular shoulder 21 defining the forward opening of counterbore 14. Space is provided between heat shield 13 and the surfaces of handle 3 defined by counterbore 20 and shoulder 21 to effect a second air gap 22 allowing further dissipation between shield 13 and the surrounding atmosphere. Thus, it can be noted that the only area of direct heat transfer between heating element 11 and handle 3 is that portion identified as counterbore 14. Most of the heat created by heating element 11 is dissipated by heat sink 13 into the surrounding atmosphere.

To afford pivotal support of solder feeder 2 on handle 3, a pair of integrally formed upstanding lugs 24 are provided centrally of the handle back portion. A pivot block 26 is received between lugs 24 and secured in position by a pin 28. As shown in FIG. 2, a helical compression spring 30 is disposed between pivot block 26 and handle back portion 4 and positioned forwardly of pin 28 so that the front end of pivot block 26 is biased upwardly and away from handle back portion 4. The pivot block also has a longitudinal bore 32 for receiving slidably a rear tube 34 forming part of solder feeder 2. A set screw 36 is threadably received in pivot block 26 to adjustably secure rear tube 34 in a desired longitudinal position. Solder feeder 2 additionally includes a drive block 38 having a knurled drive wheel 39 and a front guide tube 40 supporting a feeding tip 41, guide tube 40 being adjustably secured in the front end of guide block 38 by way of a set screw 42. The details of the drive block 38 as well as the measure of adjustment afforded by set screw 42 are fully disclosed in copending application Serial No. 272,511, filed April 10, 1963, now Patent No. 3,211,355, so that further description of these details is deemed unnecessary herein. It will be noted however that in accordance with the present invention pivotal movement of solder feeder 2 outwardly under the influence of compression spring 30 is limited by a fixed stop 44 formed integrally at the rear end of handle portion 4. Since movement of solder feeder 2 outwardly to a position wherein the rear portion of tube 34 comes into contact with stop 44 is to a position of nonuse, no adjustability in the stop 44 is necessary. With respect to limiting movement of the feeder 2 toward the iron 1, however, it is extremely important that an adjustable stop be provided. To this end therefore, a set screw 46 having a lock spring 48 positioned thereon is threadably received in tapered front handle portion 5. As shown in the drawings, set screw 46 is engaged by the bottom surface of drive block 38, thereby restricting the extent to which feeding tip 41 may approach heating tip 12 of soldering iron 1. Moreover, since in the operation of solder feeder 2 as described in the aforesaid copending application downward pressure is exerted on wheel 39, the positioning of set screw 46 in the handle to underlie drive block 38 reduces to a minimum erroneous positioning of feed tip 41 due to resiliency in the solder feeder.

It will thus be seen that fixed stop 44 and adjustable stop 46 will fix the limits of solder feeder movement within its pivotal plane, that is, movement of feeding tip 41 away from heating tip 12 is limited by fixed stop 44 whereas movement of the feeding tip 41 in the pivotal plane toward heating tip 12 may be very accurately controlled by proper adjustment of stop 46. Because of the manufacturing tolerance involved, it is not possible for the pivot pin 28 alone to confine solder feeder 2 to its pivotal plane. Yet, it is extremely important to precise positioning feeding tip 41 to heating tip 12 that movement of feeding tip 41 be constrained to a plane passing centrally through heating tip 12 or to the same path precisely referenced to tip 12 during each movement of tip 41 toward tip 12. For this purpose, guide means generally designated by the reference numeral 50 is positioned on the forward end of handle 3. In the embodiment shown, and as may be seen most clearly in FIG. 3 of the drawings, the guide means is in the form of a circular disc integrally formed or molded on handle 3 in such a manner that the center of the circular disc 52 is eccentrically positioned upwardly of the central axis of soldering iron 1. A radial groove 54 is formed in disc 52 and extending along the line of eccentricity to define a pair of guide surfaces 56 adjacent opposite sides of front feed tube 40. Since guide means 50 is spaced forwardly of pivot pin 28 a distance approaching one-half the complete length of solder feeder 2 an adequate moment arm is afforded so that feeder 2 is very accurately guided by sliding contact with walls 56. Also, since guide means 50 is formed from the same plastic from which handle 3 is formed, inherent lubrication is afforded between front tube 40 and walls 56. It will be appreciated that the circular shape of disc 52 will operate to prevent accidental movement of an operator's fingers forwardly of handle 3 and into contact with the hot forward portion of iron 1 and also that disc 52 will afford a further measure of heat shielding because of its shape.

When a particular soldering job desired to be accomplished requires that one end of a solder wire S be fed to one particular portion of heating tip 12, the operator first adjusts the longitudinal position of solder feeder 2 with respect to heating tip 12 by loosening set screw 36, pressing down the feeder from its normal position as shown in FIG. 1 to that position shown in FIG. 2, and, when the proper position is reached, tightening screw 36. Upon release of solder feeder 2, compression spring 30 causes the feeder to be returned to its normal position, which is controlled by fixed limit stop 44. To achieve still finer adjustment in the longitudinal or even lateral directions, set screw 42 is loosened and guide tube 40 moved in its axial direction or rotated slightly to achieve the desired lateral position. Finally, to achieve the setting necessary in the pivotal plane of solder feeder 2, it is only necessary to bring the feeder to its operating position and move the adjustable pivot limit stop or set screw 46 either upward or downward to the position desired. Now that the feeder has been set to the desired position, it is only necessary, each time a solder joint is required, for the operator to hold soldering iron 1 in his hand and depress solder feeder 2 from its normal position of FIG. 1 to its operating position as shown in FIGS. 2 and 3, and merely rotate drive wheel 39 to feed any amount of solder wire S.

When the soldering operation has been completed, the operator need only to lift his finger, by which he operated the solder feeder 2, and compression spring 30 will automatically return the feeder to its original normal position. In this position, heating tip 41 is far enough removed from heated tip 12 to prevent melting of the solder and clogging of guide tube 40. Also, if the operator merely desires to disconnect a solder joint, he leaves solder feeder 2 in its normal position, places heated tip 12 on the solder joint, and melts the solder, thus performing the disconnecting operation. It can be easily noted that for this and other purposes where solder feeder 2 is not required, it is normally in a position of noninterference.

Therefore, it can be seen that there is provided a relatively cool operating soldering iron and feeder device providing exacting precision due to the fact that solder can be accurately positioned in a pivotal plane, laterally, and longitudinally with regard to a heating tip of a soldering iron each time the device is operated. Also, there is provided a simple device which is easily operated by the use of one hand of an operator to achieve precision solder joints in relatively small spaces and with relatively small components.

While it is apparent that the embodiment of the present invention described above is well calculated to fulfill the objects of the invention, it will be appreciated that many changes, revisions, and modifications can be made without departing from the spirit or scope of the invention. Accordingly, it is to be distinctly understood that the foregoing description is illustrative only, not limiting, and that the true scope of the invention is to be determined from the appended claims.

The invention claimed is:

1. A soldering tool comprising in combination: a soldering iron including a handle, a soldering tip projecting forwardly of said handle, and means for heating said soldering tip; a solder feeder including a feeding tip, and tube means supporting said feeding tip and providing a passageway through which a solder wire may be fed, and means for delivering a solder wire through said passageway to said feeding tip; means pivotally supporting said tube means near the rear end of said handle for movement of said feeding tip between a feed position closely overlying said soldering tip and an inactive position pivoted away from said soldering tip; and guide means mounted on the forward end of said handle and thereby spaced from said pivotal support means by an amount sufficient to provide a moment arm along said tube for restricting said feeding tip to the same path during each movement thereof to said feed position.

2. A soldering tool comprising in combination: a soldering iron including a handle, a soldering tip projecting forwardly of said handle, and means for heating said soldering tip; a solder feeder including a feeding tip, and tube means supporting said feeding tip and providing a passageway through which a solder wire may be fed, and means for delivering a solder wire through said passageway to said feeding tip; means pivotally supporting said tube means near the rear end of said handle for movement of said feeding tip between a feed position closely overlying said soldering tip and an inactive position pivoted away from said soldering tip, said pivotal support means including a pivot block having a longitudinal bore therethrough for slidably receiving said tube means and means for adjustably positioning said tube means longitudinally with respect to said pivot block; adjustable stop means positioned on said handle forwardly of said pivot block and engageable with said tube means to restrict movement of said feeding tip toward said soldering tip, thereby defining said feed position; and guide means mounted on the forward end of said handle for restricting said feeding tip to the same path during each movement thereof to said feed position.

3. The combination recited in claim 2 including further stop means integrally formed in said handle rearwardly of said pivot block to restrict outward pivotal movement of said tube means and thereby define said inactive position.

4. A soldering tool comprising: a soldering iron including a handle formed of low heat transfer plastic material, heating means projecting forwardly of said sandle, and a soldering tip projecting forwardly of said heating means; a solder feeder including a feeding tip and tube means supporting said feeding tip and providing a passageway through which a solder wire may be fed, and means for delivering a solder wire through said passageway to said feeding tip; means pivotally supporting said tube means near the rear end of said handle for movement of said solder tip between a feed position closely overlying said soldering tip and an inactive position pivoted away from said soldering tip; guide means mounted on the forward end of said handle and thereby spaced from said pivotal support means by an amount sufficient to provide a moment arm along said tube for restricting said feeding tip to the same path during each movement thereof to said feed position; and heat dissipating means mounted about said heating means and adjacent the forward end of said handle, said heat dissipating means being spaced rearwardly from the soldering tip so that the dissipated heat does not increase the ambient temperature about said soldering tip.

5. The combination recited in claim 4 wherein said guide means includes a circular disc integrally formed in said handle, said disc having a radial groove therein for guidingly receiving said tube means.

6. A soldering tool comprising in combination: a soldering iron and a solder dispenser; said soldering iron having a handle of insulating, low heat transfer material, a soldering tip projecting forwardly of said handle, and a heating element between said soldering tip and said handle for heating said soldering tip; said solder dispenser having a front guide tube and a rear adjusting tube, a drive block connected between said guide tube and said adjusting tube, a feeding tip projecting forwardly of said guide tube, and a pivot block for mounting said adjusting tube on said handle; support means integrally formed as a portion of the handle for pivotally supporting said dispenser for movement between an active position wherein said feeding tip overlies said soldering tip and an inactive position wherein said feeding tip is pivoted away from said soldering tip; a fixed limit stop integrally formed into a rear portion of said handle for contact with said adjusting tube to limit the inactive position of said solder dispenser; a grooved guide element integrally formed into a front portion of said handle for contact with said front guide tube to restrict the movement of said dispenser to the pivotal plane; and an adjustable limit stop provided in a central portion of said handle for contact with said drive block to control the spacing between said feeding tip and said soldering tip, thereby enabling adjustment of said active position.

7. The invention as defined in claim 6 further comprising a cylindrical cup-shaped heat shield and sink mounted between said heating element and handle to dissipate a major portion of the heat produced by the heating element.

8. The invention as defined in claim 7 further comprising means to adjust the axial position of said adjusting tube relative to said pivot block thereby providing further adjustability of said active position.

9. The invention as defined in claim 8 further comprising means to adjust the axial and radial position of said front guide tube relative to said drive block.

10. The invention as described in claim 9 further comprising means coacting between said soldering iron support means and said dispenser pivot block to automatically return said dispenser to the inactive position when feeding is accomplished.

11. The invention as defined in claim 10 further comprising means mounted in said drive block to feed solder to the heated tip of the soldering iron.

12. A soldering tool comprising in combination: a soldering iron including a handle, a soldering tip projecting forwardly of said handle, and means for heating said soldering tip; a solder feeder including a feeding tip, and tube means supporting said feeding tip and providing a passageway through which a solder wire may be fed, said tube means including a drive mechanism for advancing said solder through said passageway to said feeding tip; means pivotally supporting said tube means near the rear end of said handle for movement of said feeding tip between a feed position closely overlying said soldering tip and an inactive position pivoted away from said soldering tip; guide means mounted on the forward end of said handle for restricting said tip to the same path during each movement thereof to said feed position; and adjustable stop means positioned on said handle and engageable with said drive mechanism to restrict movement of said feeding tip toward said soldering tip, thereby defining said feed position.

References Cited by the Examiner

UNITED STATES PATENTS

| 1,287,448 | 12/1918 | Ryden | 228—53 |
| 1,927,570 | 9/1933 | Lofthouse | 228—53 |

FOREIGN PATENTS

| 463,141 | 3/1937 | Great Britain. |

WHITMORE A. WILTZ, *Primary Examiner.*

M. L. FAIGUS, *Assistant Examiner.*